United States Patent Office 3,825,585
Patented July 23, 1974

3,825,585
N-CYCLOALKYL HYDROXAMIC ACIDS
Cecil C. Chappelow, Jr., and James F. Engel, Kansas City, Mo., assignors to Kerr-McGee Corporation, Oklahoma City, Okla.
No Drawing. Filed June 3, 1971, Ser. No. 149,750
Int. Cl. C07c 103/30; C07f 9/00
U.S. Cl. 260—500.5 H           7 Claims

ABSTRACT OF THE DISCLOSURE

A new class of compounds useful, for example, as metal extractants, is provided. The compounds are hydroxamic acids, with N-cycloalkyl groups and represented by the general formula:

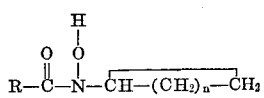

wherein $n$ is an integer of from 3 to 6, inclusive, and R is a hydrocarbon radical containing from 1 to 20 carbon atoms.

BACKGROUND OF THE INVENTION

Certain organic compounds are known to have the ability to chelate metal ions. Thus, it is known that the compound N-phenylbenzohydroxamic acid has been used for many years as a pentavalent vanadium extractant in analytical procedures. However, there is a need for additional compounds having the capability of functioning as selective extractants for various metal ions in commercial metallurgical operations.

DESCRIPTION OF A PREFERRED EMBODIMENT

This invention relates to certain novel N-substituted hydroxamic acids. The N-substituted hydroxamic acids of the invention have cycloalkyl groups and are capable of chelating metal ions.

The novel compounds of the present invention are represented by the general formula:

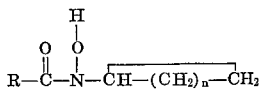

wherein R is selected from the group consisting of alkyl, cycloalkyl, alkaryl, substituted alkaryl, aralkyl, substituted aralkyl, heterocyclic, substituted heterocyclic, aryl, substituted aryl, alkoxyaryl, or substituted alkoxyaryl radicals having from 1 to 20 carbon atoms and $n$ is an integer of from 3 to 6, inclusive. A preferred group of radicals are those containing from 6 to 16 carbon atoms.

Examples of the group

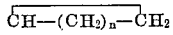

include cyclopentyl, cyclohexyl, cycloheptyl and cyclooctyl.

Examples of the radical R include heptyl, octyl, decyl, octadecyl, diethylheptyl, butylcyclohexyl, p-ethylphenyl, p-t-butylphenyl, 2-thienyl, 2-furyl, cinnamyl, 2-quinolyl, p-octylphenyl, p-pentyloxyphenyl, p-octyloxyphenyl, phenylmethyl, phenoxymethyl and the like. The substituted R groups can contain as substituents halogens or nitro, alkoxy or phenoxy groups.

Representative compounds are N-cyclooctylbenzo-hydroxamic acid; N-cyclopentylbenzohydroxamic acid; N-cyclohexyl-p-t-butylbenzohydroxamic acid and N-cycloheptylbenzohydroxamic acid.

The compounds of this invention may be synthesized by reacting the appropriate N-cycloalkylhydroxylamine of the formula:

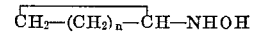

wherein $n$ has a value of 3, 4, 5 or 6. Thus, the applicable amines are N-cyclopentylhydroxylamine, N-cyclohexylhydroxylamine, N-cycloheptylhydroxylamine and N-cyclooctylhydroxylamine.

The cycloalkylhydroxylamine is reacted with an acid chloride of the following formula:

wherein R is a radical as defined hereinbefore.

In preparing the compounds of this invention, equimolar amounts of the appropriate acid chloride and N-substituted hydroxylamine are added to an appropriate solvent in the presence of an acid acceptor such as pyridine, sodium carbonate or an equimolar excess of the N-substituted hydroxylamine itself. The reaction mixture is worked up by usual organic synthesis procedures and the product recrystallized from an appropriated solvent.

The reaction takes place in accordance with the following equation:

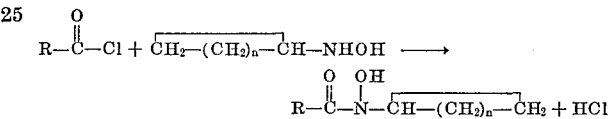

The foregoing description and the following specific examples are for the purpose of illustration and not to be considered to be limiting the scope of the invention, reference being had to the appended claims for this purpose.

EXAMPLE A

N-cyclohexyl-p-chlorobenzohydroxamic acid

To a stirred solution of 23.0 g. (0.2 mole) of N-cyclohexylhydroxylamine in 400 ml. of tetrahydrofuran was added dropwise 17.5 g. (0.1 mole) of p-chlorobenzoyl chloride. After completion of the addition, which caused the temperature to rise from 25° to 35° C., the reaction mixture was cooled to 5° C. and filtered. The filtrate was evaporated to dryness and the solid residue was washed with water. The resultant solid was dissolved in hot benzene, dried over anhydrous sodium sulfate, filtered and cooled. A total of 15.4 g. (a 61% yield) of N-cyclohexyl-p-chlorobenzohydraxamic acid was obtained as a white crystalline powder, m.p. 169–171° C.

N-cyclooctylbenzohydroxamic acid and N-cycloheptylbenzohydroxamic acid were prepared in a similar manner, the respective yields being 42% and 58%. All of the products were characterized by elemental analysis, infrared and nuclear magnetic resonance spectroscopy. Many other compounds have been made by this method, for example, N-cyclohexyl-2-ethylhexanohydroxamic acid was made in 54% yield.

EXAMPLE B

N-cyclohexyl-n-octanohydroxamic acid

To a stirred solution of 11.5 g. (0.1 mole) of N-cyclohexylhydroxylamine and 7.0 g. (0.1 mole) of pyridine in 400 ml. of diethyl ether, 16.3 g. (0.1 mole) of n-octanoyl chloride was added dropwise. During the addition, the temperature was controlled at 0° C. with an ice bath surrounding the reaction vessel. The solution was filtered, the ether evaporated and the product recrystallized. The yield was 16%. When this compound was prepared by the method described in Example A, the yield was 70%. The product was characterized by the methods described in Example A.

It will be appreciated by those skilled in the art that the N-substituted cycloalkylhydroxamic acids of the instant invention may be prepared by either of the procedures outlined in Examples A and B above. The percentage yield of product will, of course, depend upon the procedure utilized. The procedure that will yield the highest percentage of product will depend upon the constituents utilized and can be readily determined with a minor amount of experimentation.

Further, examples of the compounds that are contemplated within the scope of the instant invention include N-cyclohexyl-2-methoxybenzohydroxamic acid, N-cyclohexyl-p-methylbenzohydroxamic acid, N-cyclohexyl-3-nitrobenzohydroxamic acid, N-cyclohexylphenylethanohydroxamic acid, N-cyclohexylcyclohexylmethanohydroxamic acid, N-cyclohexyl-n-octanohydroxamic acid, N-cyclohexyl-n-heptanohydroxamic acid, N-cyclohexyl-n-hexanohydroximic acid, N-cyclohexyl-n-pentanohydroxamic acid, N-cyclohexylbenzohydroxamic acid, N-cyclohexyl-p-methoxybenzohydroxamic acid, N-cyclohexyl-n-butanohydroxamic acid, and N-cyclohexyl-2-furohydroxamic acid.

EXAMPLE C

Extractant properties of N-substituted hydroxamic acids

The following series of tests were performed for the purpose of demonstrating the utility of the N-substituted cycloalkyl hydroxamic acids of the instant invention as extractants for certain metal ions.

The general procedure utilized was to prepare a 0.01 molar synthetic acidic solution of vanadium. Substantially all of the vanadium being present in either the tetravalent state [oxovanadium(IV)] or in the pentavalent oxidation state [dioxovanadium(V)] as indicated in the Table I below. A sufficient amount of $H_2SO_4$ was added to the solution to provide a pH of about 1.0. The solution thus prepared was contacted with an extractant comprising an N-substituted cycloalkyl hydroxamic acid in an organic carrier. Samples of the solution were obtained, at various time intervals, analyzed to determine the percent vanadium extracted utilizing the various extractants and the results recorded in Table I below.

TABLE I.—THE EXTRACTANT PROPERTIES OF N-SUBSTITUTED HYDROXAMIC ACIDS

| Extractant | Oxidation state of the vanadium | Molarity of extractant | Organic carrier | Percent vanadium extracted at various contact times (min.) | | | | | | | | |
|---|---|---|---|---|---|---|---|---|---|---|---|---|
| | | | | 5 | 15 | 30 | 60 | 90 | 100 | 120 | 195 | 1,000 |
| N-cyclooctylbenzohydroxamic acid | IV | 0.050 | Toluene | 16.0 | 35.0 | 57.0 | 73.0 | 81.0 | 82.0 | | | |
| N-cycloheptylbenzohydroxamic acid | IV | 0.050 | do | 37.0 | 68.0 | 78.0 | 82.0 | 82.0 | 82.0 | | | |
| N-cyclohexylphenylethanohydroxamic acid | IV | 0.050 | do | 48.0 | 69.0 | 76.0 | 77.0 | 76.0 | 77.0 | | | |
| N-cyclohexyl-3-nitrobenzohydroxamic acid | IV | 0.025 | do | 28.0 | 33.0 | 33.0 | | | | | | |
| N-cyclohexyl-2-methoxybenzohydroxamic acid | IV | 0.025 | do | 49.0 | 58.0 | 59.0 | 56.0 | 58.0 | 56.0 | | | |
| N-cyclohexyl-n-butanohydroxamic acid | IV | 0.050 | do | 79.0 | 81.0 | 81.0 | 81.0 | 81.0 | 81.0 | | | |
| N-cyclohexyl-n-pentanohydroxamic acid | IV | 0.050 | do | 62.0 | 83.0 | 85.0 | 85.0 | 85.0 | 85.0 | | | |
| N-cyclohexyl-n-hexanohydroxamic acid | IV | 0.050 | Toluene | 32.0 | 59.0 | 77.0 | 84.0 | 86.0 | 86.0 | | | |
| | | 0.050 | n-Hexane | 21.0 | 22.0 | 22.0 | 22.0 | 24.0 | 25.0 | | | |
| N-cyclohexyl-n-heptanohydroxamic acid | IV | 0.050 | Toluene | 15.0 | 28.0 | 40.0 | 61.0 | 70.0 | 78.0 | | | |
| N-cyclohexyl-n-octanohydroxamic acid | IV | 0.050 | do | 10.0 | 22.0 | 34.0 | 49.0 | 62.0 | 68.0 | | | |
| N-cyclohexylbenzohydroxamic acid | IV | 0.050 | Toluene plus TDA (5%) | 67.0 | 75.0 | 76.0 | 76.0 | 75.0 | | {76.0 / 78.0} | 80.0 | 80.0 |
| | IV | 0.050 | Toluene | 70.0 | 81.0 | 84.0 | 84.0 | 84.0 | | 84.0 | | 78.0 |
| | V | 0.050 | Toluene plus TDA (5%) | 100.0 | 100.0 | | 100.0 | | | 100.0 | | |
| | V | 0.050 | Toluene | 100.0 | 93.5 | 90.6 | 84.3 | 82.7 | | 79.7 | | |
| N-cyclohexyl-p-methylbenzohydroxamic acid | IV | 0.025 | do | 23.0 | 40.0 | 51.0 | 54.0 | 54.0 | | 54.0 | | |

Note.—TDA=Tridecanol alcohol.

What is claimed is:

1. A compound of the formula

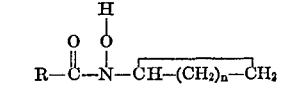

wherein R is an alkyl radical having from 1 to 20 carbon atoms and $n$ is an integer of from 3 to 6, inclusive.

2. A compound as set forth in Claim 1 wherein R contains from 6 to 16 carbon atoms.

3. A compound as set forth in Claim 2 wherein $n$ equals 3.

4. A compound as set forth in Claim 2 wherein $n$ equals 4.

5. A compound as set forth in Claim 2 wherein $n$ equals 5.

6. A compound as set forth in Claim 2 wherein $n$ equals 6.

7. A compound which is N-cyclohexyl-n-octanohydroxamic acid.

References Cited

UNITED STATES PATENTS

| | | | |
|---|---|---|---|
| 3,277,107 | 10/1966 | Neighbors | 260—500.5 H |
| 3,282,986 | 11/1966 | Kaczka | 260—500.5 H |
| 3,439,018 | 4/1969 | Brookes et al. | 260—500.5 H |
| 3,691,234 | 9/1972 | Kiefer et al. | 260—500.5 H |

JOSEPH E. EVANS, Primary Examiner

U.S. Cl. X.R.

210—38; 260—287 R, 322.2, 347.3, 429 J